United States Patent [19]
Numata et al.

[11] Patent Number: 5,657,134
[45] Date of Patent: Aug. 12, 1997

[54] DIGITAL CIRCUIT MULTIPLIER EQUIPMENT FOR HANDLING OF FACSIMILE SIGNALS BY ADDITION OF CONTROLLED VARIABLE DELAY TO FACSIMILE CONTROL CHANNEL SIGNALS

[75] Inventors: Yoshiaki Numata, Miyagi; Minoru Shinta, Tokyo, both of Japan

[73] Assignee: NEC Corporation, Tokyo, Japan

[21] Appl. No.: 520,178

[22] Filed: Aug. 28, 1995

[30] Foreign Application Priority Data

Aug. 26, 1994 [JP] Japan .................. 6-201866

[51] Int. Cl.$^6$ .................................. H04M 11/00
[52] U.S. Cl. .................. 358/425; 358/434; 358/438
[58] Field of Search .................. 370/84, 110.1, 370/79, 104.1, 112; 358/468, 409, 412, 425, 442, 434, 438, 407; 375/222

[56] References Cited

FOREIGN PATENT DOCUMENTS

| | | |
|---|---|---|
| 60-126970 | 7/1985 | Japan . |
| 61-133764 | 6/1986 | Japan . |
| 6-191087 | 7/1994 | Japan . |

OTHER PUBLICATIONS

Intelsat Earth Station Standards (IESS) Document IESS-501 (Rev. 3) "Appendix B Spec . . . Facsimile Demodulation/Remodulation Function of the DCME", (Recommendation G. 766) 1992, pp. 36-44.

Primary Examiner—Alpus H. Hsu
Assistant Examiner—Seema S. Rao
Attorney, Agent, or Firm—Sughrue, Mion, Zinn, Macpeak & Seas

[57] ABSTRACT

A facsimile transmission apparatus includes a demodulator, an identifier, a control signal generator, a variable delay controller, and a multiplex transmission unit. The modulator demodulates a facsimile signal to output a demodulated signal. The identifier identifies the facsimile signal as one of a predetermined low-speed signal and a predetermined high-speed signal to output an identification signal. The control signal generator generates facsimile control channel (FCC) messages for controlling a protocol between facsimile apparatuses on the basis of the identification signal from the identifier. The variable delay controller performs variable delay control for the FCC messages from the control signal generator such that the FCC messages can be transmitted in a generation order. The multiplex transmission unit multiplexes each variably delayed FCC message from the variable delay controller with a demodulated signal, from the demodulator, corresponding to the variably delayed FCC message to transmit a multiplexed signal.

10 Claims, 2 Drawing Sheets

DIGITAL CIRCUIT MULTIPLIER EQUIPMENT FOR HANDLING OF FACSIMILE SIGNALS BY ADDITION OF CONTROLLED VARIABLE DELAY TO FACSIMILE CONTROL CHANNEL SIGNALS

BACKGROUND OF THE INVENTION

The present invention relates to a facsimile signal transmission apparatus and, more particularly, to an FCC (Facsimile Control Channel) message transmission apparatus for controlling a protocol of a facsimile signal transmitted from an apparatus which demodulates/modulates and transmits a facsimile signal.

A DCME (Digital Circuit Multiplication Equipment) serving as a highly efficient terminal apparatus increases a channel accommodation capacity for a speech/speech-range data signal about five times using a DSI (Digital Speech Interpolation) technique, a VBR ADPCM (Variable Bit Rate Adaptive Differential Pulse Code Modulation) technique, and a facsimile compression technique. In this DCME, the voice component of a speech signal is defined to be assigned to a transmission channel as a 32/24/16-kbit/s ADPCM signal, a speech band data signal of a modem is defined to be assigned to the transmission channel as a 40-kbit/s ADPCM signal, and a speech band data signal of a facsimile is defined to be assigned to the transmission channel as a facsimile bank constituted by FDCs (Facsimile Data Channels) respectively having transmission rates (CCITT Rec. G. 763, G. 766).

A facsimile compression function is realized on the basis of the arrangement of a facsimile block. That is, an FCC (Facsimile Control Channel) message for realizing facsimile communication control procedures (CCITT Rec. T. 30) is arranged at the start of the facsimile block, and FDCs each having a transmission rate and obtained by demodulating an input facsimile signal are arranged after the FCC message. When the facsimile signal is to be output to the transmission channel, the facsimile signal is assigned as a facsimile bank (4 bits) serving as the transmission unit of the demodulated signal of the facsimile signal.

An FCC message transmission scheme of a conventional DCME is described in detail in the following document: INTELSAT EARTH STATION STANDARDS (IESS) Document IESS-501 (Rev. 3) "APPENDIX B SPECIFICATION FOR THE FACSIMILE DEMODULATION/ REMODULATION FUNCTION OF THE DCME" (Recommendation G. 766) 1992, pp. 36–44. The outline of the FCC message transmission scheme of the DCME will be briefly described below with reference to this document.

FIG. 2 shows an arrangement of a DCME with a conventional facsimile signal transmission scheme.

Referring to FIG. 2, on the coding side of the DCME applied with the facsimile signal transmission scheme, a facsimile input signal input from an input terminal 30 is supplied to a demodulator 31 and an identifier 32. The demodulator 31 demodulates the high- and low-speed signals of the facsimile input signal to supply them to a multiplexer 35.

Facsimile transmission control procedures are generally standardized according to CCITT Rec. T. 30. Of these procedures, a binary code signal scheme capable of performing complex operation procedures is mainly applied to a Group 3 digital facsimile. All control signals in the binary code signal scheme are transmitted/received to be arranged in an HDLC (High Level Data Link Control) frame, and a preamble is always transmitted ahead of a binary control signal at the start of the signals. In this case, the preamble represents that the flags ("01111110") of an HDLC frame of 1 second ±15% are continuously transmitted when a 300-bit/s signal (low-speed signal) is used.

A training signal (high-speed signal) adjusts a high-speed modem for transmitting a facsimile message. The training signal is constituted by a training sequence defined by the high-speed modem to be used (for example, V. 29 9,600 bits/s).

Unlike the control signal, the facsimile message signal (high-speed signal) is not arranged in HDLC frame, but transmitted as a continuous bit sequence of one page.

As described above, a facsimile input signal must be identified as a low-speed signal (control signal) or a high-speed signal (training signal and facsimile message signal) to perform the facsimile transmission control as described above. For this reason, the identifier 32 identifies the facsimile input signal (low-speed signal or high-speed signal) to supply an identification result to a control signal generator 33. The control signal generator 33 generates FCC messages in accordance with the identification result from the identifier 32 and supplies them to a queue transmitter 34 in a generation order. The FCC messages respectively have priority levels for transmission. The queue transmitter 34 transmits the FCC messages in units of priority levels to supply them to the multiplexer 35. The multiplexer 35 multiplexes a demodulated signal output from the demodulator 31 with an FCC message output from the queue transmitter 34 to transmit the multiplexed signal from, a transmission terminal 36.

On the decoding side of the DCME, a separator 38 separates the multiplexed code signal received from a reception terminal 37, and the separated signals are supplied to a control signal receiver 39 and a remodulator 40, respectively. The control signal receiver 39 controls the remodulator 40 in accordance with the FCC message separated by the separator 38, and the remodulator 40 remodulates the demodulated signal to output it from an output terminal 41 as a facsimile signal.

The facsimile transmission control procedures define that a time of 75±20 ms is required for a switching operation between a low-speed signal (300 bits/s) for controlling a protocol and a high-speed signal (e.g., 9,600 bits/s) for transmitting a facsimile message.

According to an FCC message transmission scheme in the conventional facsimile signal transmission scheme, when FCC messages generated in facsimile communication are transmitted in a priority order, the lower limit of the defined value of 75±20 ms required for a switching operation between a low-speed signal and a high-speed signal cannot be kept in a situation wherein the number of facsimile channels largely changes. In an extreme case, when a given FCC message has a priority level higher than that of an FCC message generated before the given FCC message is generated, these FCC messages are disadvantageously transmitted in a reverse order.

SUMMARY OF THE INVENTION

It is an object of the present invention to provide a facsimile signal transmission apparatus capable of keeping the lower limit of a time required for a switching operation between a low-speed signal and a high-speed signal in a situation wherein the number of facsimile channels largely changes.

In order to achieve the above object, according to the present invention, there is provided a facsimile transmission apparatus comprising demodulation means for demodulating a facsimile signal to output a demodulated signal, identification means for identifying the facsimile signal as one of a predetermined low-speed signal and a predetermined high-speed signal to output an identification signal, control signal generation means for generating facsimile control channel (FCC) messages for controlling a protocol between facsimile apparatuses on the basis of the identification signal from the identification means, variable delay control means for performing variable delay control for the FCC messages from the control signal generation means such that the FCC messages can be transmitted in a generation order, and multiplex transmission means for multiplexing each variably delayed FCC message from the variable delay control means with a demodulated signal, from the demodulation means, corresponding to the variably delayed FCC message to transmit a multiplexed signal.

DESCRIPTION OF THE PREFERRED EMBODIMENT

The present invention will be described below with reference to the accompanying drawing.

Figure 1:
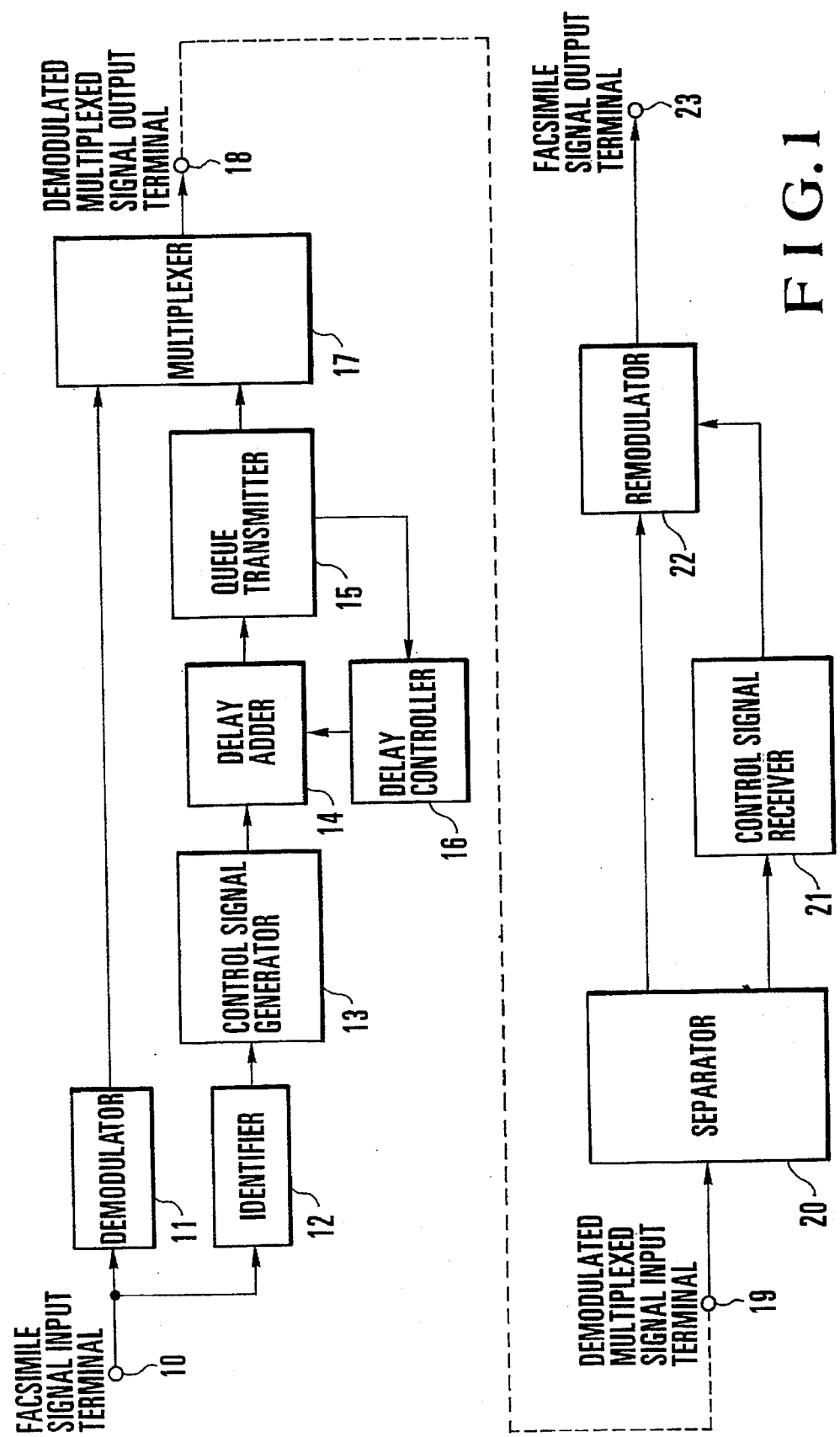
FIG. 1 is a block diagram showing a DCME applied with an embodiment of the present invention.
Figure 2:
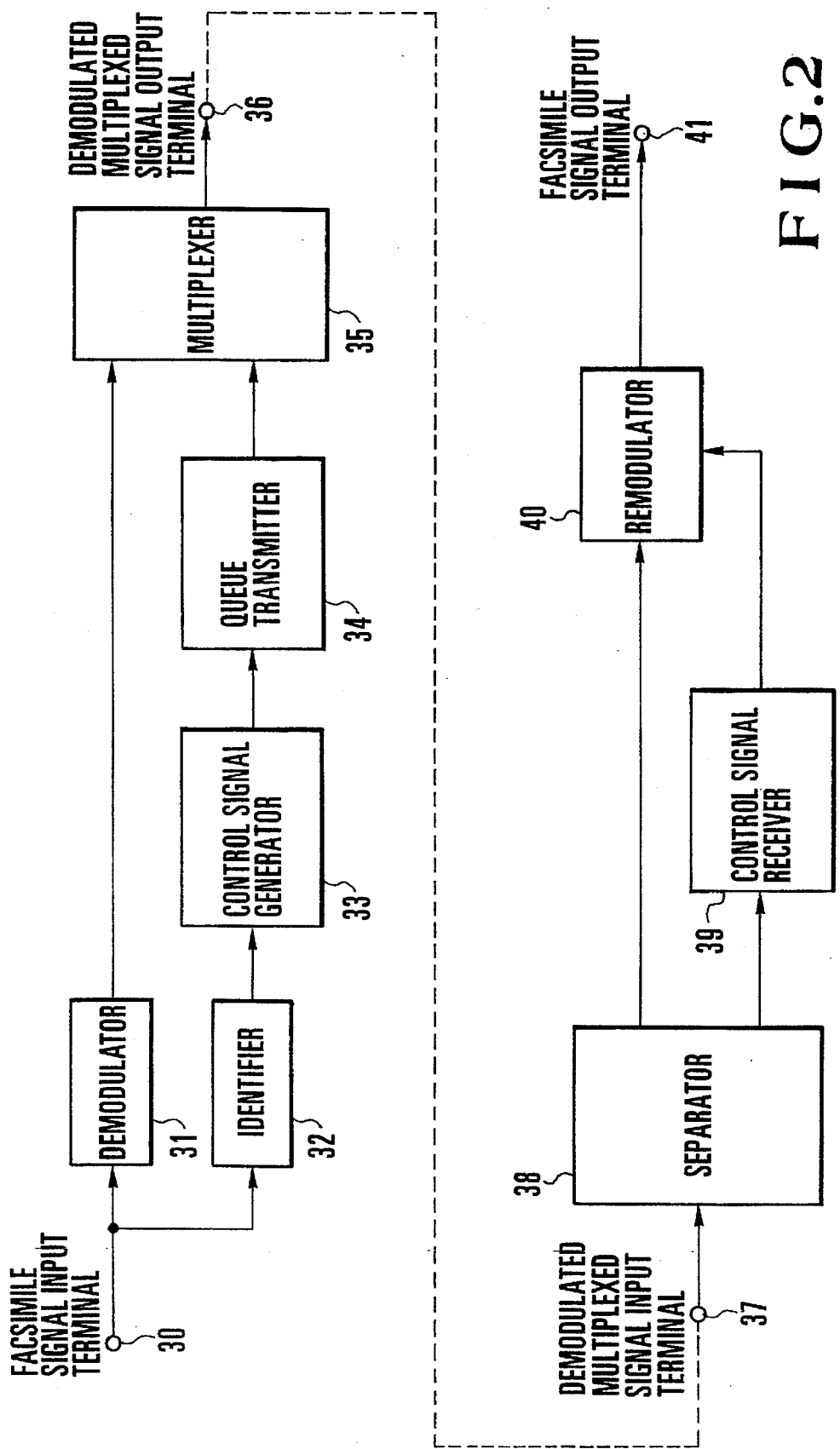
FIG. 2 is a block diagram showing a DCME applied with a conventional facsimile signal transmission scheme.

FIG. 1 shows a DCME applied with an embodiment of the present invention.

Referring to FIG. 1, on the transmission side of an FCC (Facsimile Control Channel) message transmission scheme for controlling a protocol between facsimiles in systems for demodulating/modulating facsimile signals to transmit the demodulated/modulated signals, the DCME applied with this embodiment has a demodulator 11 for demodulating an input facsimile signal, an identifier 12 for identifying the input facsimile signal as a low-speed signal or a high-speed signal, a control signal generator 13 for generating FCC messages on the basis of an identification signal from the identifier 12, a delay adder 14 for varying the delay times of the FCC messages generated by the control signal generator 13, a queue transmitter 15 for transmitting the FCC messages delayed by the delay adder 14 in units of priority levels, a delay controller 16 for controlling a delay addition value for the delay adder 14 to keep a time required for a switching operation from a low-speed signal to a high-speed signal with respect to the FCC messages output from the queue transmitter 15, and a multiplexer 17 for multiplexing a demodulated signal output from the demodulator 11 with an FCC message output from the queue transmitter 15 to transmit the multiplexed signal. On the reception side, the DCME has a separator 20 for separating the demodulated signal and the FCC message from the input multiplexed code signal, a control signal receiver 21 for controlling remodulation of the demodulated signal in accordance with the FCC message separated by the separator 20, and a remodulator 22 for remodulating the demodulated signal separated by the separator 20 to output the remodulated signal as a facsimile signal.

An operation of the DCME applied with this embodiment will be described below.

On the transmission side, a facsimile input signal input from an input terminal 10 is supplied to the demodulator 11 and the identifier 12. The demodulator 11 demodulates the facsimile input signal to supply the demodulated signal to the multiplexer 17. The identifier 12 identifies the facsimile input signal as a low-speed signal or a high-speed signal to supply an identification result to the control signal generator 13. The control signal generator 13 generates an FCC message on the basis of the identification result to supply the FCC message to the delay adder 14.

Facsimile transmission control procedures define that a time of 75±20 ms is required for a switching operation between a low-speed signal (300 bits/s) for controlling a protocol and a high-speed signal (9,600 bits/s) for transmitting a facsimile message.

This time gap must be kept between the following signals: ① a low-speed DCS (Digital Command Signal) and a high-speed TCF (Training Check) signal; ② a high-speed facsimile message signal (page data) and a low-speed MPS (MultiPage Signal); ③ a high-speed facsimile message signal (page data) and a low-speed EOM (End Of Message) signal; and ④ a high-speed facsimile message signal (page data) and a low-speed EOP (End Of Procedures) signal.

Generation of the FCC message will be described below with reference to a case using the DCS signal and the TCF signal. A signal input from the input terminal 10 is the DCS signal. The identifier 12 identifies the DCS signal as a low-speed signal and supplies an identification result to the control signal generator 13. The control signal generator 13 generates an FCC message "SIGNALLING" at the start of the low-speed signal and generates an FCC message "IDLE" at the end of the low-speed signal. Thereafter, since the TCF is input, the identifier 12 identifies the TCF signal as a high-speed signal and supplies an identification result to the control signal generator 13. The control signal generator 13 generates an FCC message "TRAINING" at the start of the high-speed signal and generates an FCC message "IDLE" at the end of the high-speed signal. More specifically, the time gap between the message "IDLE" at the end of the low-speed signal and the message "TRAINING" at the start of the high-speed signal must be 75±20 ms.

A case wherein FCC messages generated during facsimile communication are transmitted in a generation order when the number of facsimile channels largely changes will be described below. Consider that a DCS signal and a TCF signal are input to a certain channel. Assume that a message "IDLE" representing the end of the DCS signal at time t1 at which the number of FCC messages to be transmitted is considerably large is transmitted at the last queue, and that a message "TRAINING" representing the start of the TCF signal at time t2 at which the number of FCC messages is considerably small is transmitted at the first queue. In this case, the time gap between the message "IDLE" and the message "TRAINING" decreases and cannot be kept at the lower limit of 55 ms. In an extreme case, the messages "IDLE" and "TRAINING" may be transmitted in a reverse order.

The delay adder 14 varies the transmission delay time of FCC messages generated by the control signal generator 13 in accordance with a signal from the delay controller 16, and the delayed FCC messages are supplied to the queue transmitter 15. The queue transmitter 15 transmits the FCC messages delayed by the delay adder 14 in units of priority levels to supply them to the multiplexer 17. The queue transmitter 15 supplies a control signal to the delay controller 16 to keep a time required for a switching operation from a low-speed signal to a high-speed signal between FCC messages ("IDLE"—"TRAINING" in a switching operation from a low-speed signal to a high-speed signal and "IDLE"—"SIGNALLING" in a switching operation from a high-speed signal to a low-speed signal) at a predetermined value.

Consider that a DCS signal and a TCF signal are input to a certain channel when the number of facsimile channels largely changes. A message "IDLE" representing the end of the DCS signal at time t1 (at which the number of FCC messages to be transmitted is very large) is transmitted by the queue transmitter 15 at the last queue, and its transmission control signal is output to the delay controller 16. When a message "TRAINING" representing the start of the TCF signal at time t2 (at which the number of FCC messages to be transmitted is very small) is transmitted by the queue transmitter 15 at the first queue, the transmission control signal of the message "IDLE" transmitted at time t1 has been supplied to the delay controller 16, and the delay controller 16 having output a delay addition signal to the delay adder 14 to ensure a timing gap 55 ms which is the lower limit of the time gap between the message "IDLE" and the message "TRAINING". The delay adder 14 delays FCC messages ("TRAINING") generated by the control signal generator 13 prior to supplying the FCC messages to the queue transmitter 15. The queue transmitter 15 transmits the FCC messages delayed by the delay adder 14 in units of priority levels to supply them to the multiplexer 17. The multiplexer 17 multiplexes a demodulated signal output from the demodulator 11 with an FCC message output from the queue transmitter 15 to transmit the multiplexed signal from a transmission terminal 18.

On the reception side, the multiplexed code signal received from a reception terminal 19 is separated by the separator 20, and the separated signals are supplied to the control signal receiver 21 and the remodulator 22, respectively. The control signal receiver 21 controls the remodulator 22 in accordance with the FCC message separated by the separator 20, and the remodulator 22 remodulates the demodulated signal to output the remodulated signal from an output terminal 23.

As has been described above, a facsimile signal transmission apparatus according to the present invention comprises a variable delay control means for identifying a facsimile input signal as a predetermined low-speed signal or a predetermined high-speed signal, generating predetermined FCC (Facsimile Control Channel) messages in accordance with the identification result, and performing variable delay control to transmit the FCC messages in a generation order, and a multiplex transmission means for multiplexing each variably delayed FCC message with a demodulated signal of the facsimile input signal corresponding to the variably delayed FCC message. Therefore, even if the number of facsimile channels changes significantly, the lower limit of a predetermined value of 75±20 ms, which is a time required for a switching operation from a low-speed signal, and vice versa, to a high-speed signal can be kept. In addition, even if a given FCC message having a priority level higher than that of an FCC message generated before the given FCC message is generated, these FCC messages will not be transmitted in a reverse order.

What is claimed is:

1. A facsimile transmission apparatus comprising:

demodulation means for demodulating facsimile signals to output demodulated signals;

identification means for identifying each of the facsimile signals as one of a predetermined low-speed signal and a predetermined high-speed signal to output an identification signal;

control signal generation means for generating facsimile control channel (FCC) messages for controlling a protocol between facsimile apparatuses on the basis of the identification signal from said identification means;

variable delay control means for performing variable delay control for the FCC messages from said control signal generation means such that the FCC messages can be transmitted in order of generation; and multiplexing transmission means for multiplexing each variably delayed FCC message from said variable delay control means with a demodulated signal, selected from said demodulated signals, corresponding to the variably delayed FCC message, to transmit a multiplexed signal.

2. The apparatus according to claim 1, wherein said variable delay control means comprises:

delay addition means for varying delay times of the FCC messages from said control signal generation means on the basis of a delay addition value to output the delayed FCC messages;

queue transmission means for transmitting the delayed FCC messages from said delay addition means according to priority levels of the delayed FCC messages, and outputting a transmission control signal; and delay control means for generating and providing said delay addition value to said delay addition means to cause variable delay of each FCC message by generating said delay addition value on the basis of the transmission control signal from said queue transmission means to keep a time required to switch the FCC message output from said queue transmission means from a low-speed signal to a high-speed signal at a predetermined value.

3. The apparatus according to claim 2, wherein when an FCC message representing the end of a low-speed signal is transmitted at a last queue, said queue transmission means outputs the transmission control signal to said delay control means.

4. A facsimile signal transmission apparatus comprising a transmitter for demodulating facsimile signals to transmit them as demodulated facsimile signals and a receiver for modulating received facsimile signals to output modulated facsimile signals, wherein said transmitter is constituted by:

demodulation means for demodulating the facsimile signals to output the demodulated signals;

identification means for identifying each of the facsimile signals as one of a predetermined low-speed signal and a predetermined high-speed signal to output an identification signal;

control signal generation means for generating facsimile control channel (FCC) messages for controlling a protocol between facsimile apparatuses on the basis of the identification signal from said identification means;

variable delay control means for performing variable delay control for the FCC messages from said control signal generation means such that the FCC messages can be transmitted in order of generation; and multiplex transmission means for multiplexing each variably delayed FCC message from said variable delay control means with a demodulated signal, selected from said demodulated signals, corresponding to the variably delayed FCC message, to transmit a multiplexed code signal, and said receiver is constituted by:

separation means for separating the multiplexed code signal from said multiplex transmission means into a received demodulated signal and a received FCC message;

remodulation means for remodulating the received demodulated signal from said separation means to output a remodulated signal as a facsimile signal; and control signal reception means for controlling a remodulation operation in said remodulation means on the basis of the received FCC message from said separation means.

5. The apparatus according to claim 4, wherein said variable delay control means comprises:

delay addition means for varying delay times of the FCC messages from said control signal generation means on the basis of a delay addition value to output the delayed FCC messages;

queue transmission means for transmitting the delayed FCC messages from said delay addition means according to priority levels of the delayed FCC messages, and outputting a transmission control signal; and delay control means for generating and providing said delay addition value to said delay addition means to cause variable delay of each FCC message by generating said delay addition value on the basis of the transmission control signal from said queue transmission means to keep a time required to switch the FCC message output from said queue transmission means from a low-speed signal to a high-speed signal at a predetermined value.

6. The apparatus according to claim 5, wherein when an FCC message representing the end of a low-speed signal is transmitted at a last queue, said queue transmission means outputs the transmission control signal to said delay control means.

7. A digital circuit multiplier equipment for transmitting facsimile signals comprising:

demodulation means for demodulating the facsimile signals to output demodulated signals;

identification means for identifying each one of the facsimile signals as one of a predetermined low-speed signal and a predetermined high-speed signal to output an identification signal;

control signal generation means for generating facsimile control channel messages for controlling a protocol between facsimile apparatuses on the basis of the identification signal from said identification means;

variable delay control means for performing variable delay control for the facsimile control channel messages from said control signal generation means such that the facsimile control channel messages can be transmitted in order of generation; and multiplex transmission means for multiplexing each variably delayed facsimile control channel message from said variable delay control means with a demodulated signal, selected from said demodulated signals, corresponding to the variably delayed facsimile control channel message, to transmit a multiplexed signal.

8. The digital circuit multiplier equipment according to claim 7, wherein said variable delay control means comprises:

delay addition means for varying delay times of the facsimile control channel messages from said control signal generation means on the basis of a delay addition value to output the delayed facsimile control channel messages;

queue transmission means for transmitting the delayed facsimile control channel messages from said delay addition means according to priority levels of the delayed facsimile control channel messages, and outputting a transmission control signal; and delay control means for providing said delay addition value to said delay addition means to cause variable delay of each facsimile control channel message by generating said delay addition value on the basis of the transmission control signal from said queue transmission means to keep a time required to switch the facsimile control channel message output from said queue transmission means from a low-speed signal to a high-speed signal at a predetermined value.

9. The digital circuit multiplier equipment according to claim 8, wherein when a facsimile control channel message representing the end of a low-speed signal is transmitted at a last queue, said queue transmission means outputs the transmission control signal to said delay control means.

10. A digital circuit multiplier equipment for transmitting facsimile signals, wherein a facsimile control channel is formed for facsimile control messages which are generated based upon identification of each one of incoming facsimile signals as being one of a predetermined low-speed signal and a predetermined high-speed signal, and wherein the incoming facsimile signals are demodulated to produce demodulated facsimile signals, the digital circuit multiplier equipment comprising:

variable delay control means for performing variable delay control for the facsimile control messages in the facsimile control channel such that the facsimile control messages can be transmitted in order of generation; and multiplex transmission means for multiplexing each variably delayed facsimile control message from said variable delay control means with a demodulated facsimile signal, selected from said demodulated facsimile signals, corresponding to the variably delayed facsimile control message, to transmit a multiplexed signal.

* * * * *